(12) United States Patent
Bouteiller

(10) Patent No.: US 9,546,115 B2
(45) Date of Patent: Jan. 17, 2017

(54) HONEYCOMB ELEMENT WITH REINFORCED CORNERS

(75) Inventor: Bernard Bouteiller, Molléges (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 266 days.

(21) Appl. No.: 14/344,273

(22) PCT Filed: Sep. 12, 2012

(86) PCT No.: PCT/FR2012/052034
§ 371 (c)(1),
(2), (4) Date: Mar. 11, 2014

(87) PCT Pub. No.: WO2013/038103
PCT Pub. Date: Mar. 21, 2013

(65) Prior Publication Data
US 2014/0356570 A1    Dec. 4, 2014

(30) Foreign Application Priority Data

Sep. 14, 2011 (FR) ..................................... 11 58187
Sep. 12, 2012 (WO) ................. PCT/FR2012/052034

(51) Int. Cl.
B01D 46/24    (2006.01)
C04B 38/00    (2006.01)
B01J 35/04    (2006.01)

(52) U.S. Cl.
CPC ......... *C04B 38/0009* (2013.01); *B01D 46/247* (2013.01); *B01D 46/2455* (2013.01);
(Continued)

(58) Field of Classification Search
None
See application file for complete search history.

(56) References Cited

U.S. PATENT DOCUMENTS 5,761,787 A    6/1998 Kragle et al.
7,658,779 B2 *  2/2010 Carranza .............. B01D 46/247
                                                    55/523
(Continued)

FOREIGN PATENT DOCUMENTS

EP    0 816 065    1/1998
EP    1 142 619    10/2001
(Continued)

OTHER PUBLICATIONS

International Search Report as issued for International Application No. PCT/FR2012/052034, dated Nov. 21, 2012.

*Primary Examiner* — Humera Sheikh
*Assistant Examiner* — Nicholas W Jordan
(74) *Attorney, Agent, or Firm* — Pillsbury Winthrop Shaw Pittman LLP

(57) ABSTRACT

A monolithic honeycomb element includes a collection of adjacent ducts of mutually parallel axes separated by walls made of a porous material, the element having, in transverse cross section, a polygonal, notably quadratic cross section delimited by exterior wall elements, wherein at least one corner of the polygon, has, along the bisector of the angle at the corner, an additional thickness, such that the total thickness of the external wall, likewise measured along the bisector of the angle at the corner, is greater than the mean thickness of the exterior walls by a factor of at least 1.43, the additional thickness being obtained at least in part by an additional quantity of porous material on the external face of the corner.

19 Claims, 2 Drawing Sheets

(52) U.S. Cl.
CPC ........... *B01J 35/04* (2013.01); *C04B 38/0016* (2013.01); *B01D 46/2466* (2013.01); *B01D 2046/2492* (2013.01); *B01D 2046/2496* (2013.01); *Y10T 428/24149* (2015.01)

(56) References Cited

U.S. PATENT DOCUMENTS

2006/0289501 A1   12/2006  Michiwaki et al.
2008/0072573 A1*  3/2008  Carranza ............. B01D 46/247
                                                         60/274

FOREIGN PATENT DOCUMENTS

| EP | 1 249 262 | 10/2002 |
|----|-----------|---------|
| EP | 1 455 923 | 9/2004 |
| EP | 1 516 659 | 3/2005 |
| EP | 1 612 197 | 1/2006 |
| EP | 1 736 642 | 12/2006 |
| EP | 1 977 808 | 10/2008 |
| FR | 2 833 857 | 6/2003 |
| FR | 2 853 256 | 10/2004 |
| WO | WO 2004/065088 | 8/2004 |
| WO | WO 2004/090294 | 10/2004 |
| WO | WO 2005/016491 | 2/2005 |
| WO | WO 2005/063462 | 7/2005 |
| WO | WO 2011/020666 | 2/2011 |

* cited by examiner

HONEYCOMB ELEMENT WITH REINFORCED CORNERS

CROSS-REFERENCE TO RELATED APPLICATIONS

This application is the U.S. National Stage of PCT/FR2012/052034, filed Sep. 12, 2012, which in turn claims priority to French Application No. 1158187, filed Sep. 14, 2011. The content of both applications are incorporated herein by reference in their entirety.

The invention relates to the field of honeycomb structures, more particularly for thermal applications, notably heat exchangers or particulate filters used in an engine exhaust line to remove the soot produced by the combustion of a diesel or gasoline fuel in an internal combustion engine.

Filtration structures for the soot contained in the exhaust gases of an internal combustion engine are well known in the prior art. These structures usually have a honeycomb structure, one of the faces of the structure being for admitting the exhaust gases that are to be filtered and the other face being for discharging the filtered exhaust gases. Between the inlet and discharge faces the structure comprises a collection of adjacent ducts or channels with mutually parallel axes separated by porous filtration walls, which ducts are plugged at one or other of their ends to delimit inlet chambers opening onto the inlet face and outlet chambers opening onto the discharge face. For good gas tightness, the peripheral part of the structure is usually surrounded by a cement sealant. The channels or ducts are alternately plugged in an order such that the exhaust gases, as they pass through the honeycomb body, are forced to pass through the lateral walls of the inlet channel in order to access the outlet channels. In this way, the particulate matter or soot is deposited and builds up on the porous walls of the filtering body. Usually, the filtering bodies used in automotive exhaust lines are made of porous ceramic material, for example of cordierite, aluminum titanate or of silicon carbide or even of silicon nitride.

In the known way, during its use, the particulate filter is subjected to a succession of filtration (soot accumulation) and regeneration (soot removal) phases. During the filtration phases, the soot particulate matter emitted by the engine is captured and deposited inside the filter. During the regeneration phases, the soot particulate matter is burnt off inside the filter, in order to restore the filtration properties thereof. The porous structure is therefore subjected to intense thermo-mechanical stresses which may lead to micro-cracking liable, over time, to lead to a severe loss in the filtration capability of the unit, or even to completely deactivate same. This phenomenon is particularly observed in large-diameter monolithic filters. Indeed it has been noted, in operation in an exhaust line, that the greater the dimensions of the monolith, the steeper the thermal gradient between the middle and the periphery of such structures.

In order to solve these problems and increase the life of the filters, filtration structures that combine several honeycomb monolithic elements or blocks have more recently been proposed. The elements are usually assembled with one another by bonding using an adhesive or a cement of a ceramic nature, referred to in the remainder of the description as a cement jointing compound. Examples of such filtering structures are, for example, described in patent applications EP 816 065, EP 1 142 619, EP 1 455 923, WO 2004/090294 or even WO 2005/063462. In order to ensure better stress relief in an assembled structure, it is known that the thermal expansion coefficients of the various parts of the structure (filtration elements, cement sealant, cement jointing compound) need to be of substantially the same order of magnitude. As a result, said parts are advantageously synthesized using the same material as basis, usually silicon carbide (SiC), cordierite or aluminum titanate. This choice also makes it possible to even out the distribution of heat during filter regeneration.

During the process of manufacturing such filter structures, individual elongate elements are first of all extruded from a loose slurry of particles of the above material usually including porogenic organic materials, then these are fired in order to obtain honeycomb elements capable of filtering the particulate-laden gases through the porous walls of which they are made. These individual ceramic elements or monoliths have a radial cross section of polygonal, usually quadrangular, and particularly square, shape.

According to other possible embodiments, the cross sections may be triangular or, more rarely still, hexagonal or a mixture of these various shapes (triangular, quadrangular, hexagonal).

Conventionally in the method of obtaining a large-sized honeycomb structure (whether or not the walls are plugged by plugs at one or other of the ends), individual elements of square cross section (that will be adopted as reference in the remainder of the description although the shape is not restricted to that shape) are assembled using a cement jointing compound first of all applied to the external walls of the individual elements then fired generally at a temperature typically below 1000° C., to give the assembly sufficient cohesion without thereby rigidifying it to an extent that would tend to render its mechanical properties comparable with those of a monolithic structure of the same size.

The production of the assembled structures therefore has to be the result of a compromise between the desired adhesion between the individual elements and a limited value for the overall rigidity of the assembled structure ultimately obtained.

Such a problem becomes all the more crucial as the assembled structure usually has to have its external dimensions readjusted to suit it to its housing in the exhaust line. Usually, the large-sized structure has, for example, to take the form of an elongate cylinder, of somewhat elliptical cross section according to the specification laid down by each automotive manufacturer (here, an automotive manufacturer is understood to mean the manufacturer of private vehicles, and also the manufacturer who produces utility vehicles, notably trucks). In order to achieve such suitable shapes, it is necessary to remove the peripheral part of the structures that have been assembled from elements of square section using abrasion and ultimately to cover the cut-to-size filter with an external cement sealant in order to smooth the external surface thereof, using the principles described for example in applications EP 1142619 A1, EP 1516659 A1 or even US 2006/289501 A1.

However, when implementing the various solutions described in these earlier publications, the applicant company noticed that assembling the monolithic ceramic honeycomb elements presents problems of reliability of the method of obtaining the assembled filter, notably when one or more peripheral elements in the assembly are subjected to transverse stresses, which means to say to stresses in the plane perpendicular to the direction formed by the channels of the honeycomb. Such stress loadings result in particular from the forces applied during abrasion and removal of the peripheral portions of the assembled filter in order to resize it. If the cement does not bind firmly enough, it is commonplace for some of the individual elements, notably those furthest toward the periphery in the assembly, therefore to become detached from the structure as a whole.

The surface of the individual ceramic honeycomb elements is also very smooth and the hold of the cement on the other hand appears to require cements that offer a very strong grip. As described earlier, this strong grip can swiftly become a problem because it plays a part in rigidifying the structure as a whole. In such instances, when the final assembled filter is subjected to the high temperatures associated with burning off the soot (typically over 800° C.), the expansion phenomena may then create internal mechanical stresses liable to damage and disconnect the whole, as explained earlier.

Solutions involving reducing the rigidity of the cement by using compositions that lead to a jointing compound with a lower elastic modulus have been proposed, such as in EP 1249262. Assemblies using jointing compounds based on ceramic fibers are also disclosed in EP0816065, providing a better grip.

Other solutions exist and involve creating regions of non-adhesion in order to relieve the stresses or reduce the rigidity of the whole (FR2833857A1 or FR2853256A1). These solutions, which provide a considerable improvement in terms of the previously observed tendency of individual elements to become detached, do, however, still leave room for improvement, particularly as regards the ability to withstand the radial mechanical stresses applied to the structure during the step of resizing the assembled structure.

Within the meaning of the present invention and as indicated hereinabove, radial mechanical stresses mean stresses contributing to dislodging the individual blocks of the assembly with respect to the main central axis of the assembly which are parallel to the channels of the honeycomb. The assembly as a whole can also be weakened during handling operations carried out when the cement compound has not yet fully set and when hardening is incomplete. The most peripheral elements, particularly those of which most of the initial material has to be removed during the machining operation, are quite clearly those which have the greatest probability of becoming detached.

There are solutions aimed at eliminating the machining operation, such as for example EP1977808A1 which involves assembling peripheral individual blocks that have the final shape. The problem of handling still remains. Moreover, this solution is somewhat inflexible on an industrial scale because it entails stock control of at least three families of different individual blocks per filter shape and the creation of suitable dies for each of the elements. Furthermore, the dies have to be changed as soon as the final shape of the filter alters. Thus, on the basis of a suitable and specific die set, this solution allows the production only of assembled honeycomb structures that conform to a fixed and single outside diameter, with no possibility of adaptation.

The present invention therefore essentially has the object of solving the abovementioned manufacturing problems and, in particular, of supplying elements for creating a structure formed by the assembly of honeycombs which maintains its integrity, even under high radial mechanical stress, of the type of stress applied when it is being machined in order to obtain the final external dimensions of the structure.

More specifically, the present invention in a first aspect relates to a monolithic honeycomb element comprising a collection of adjacent ducts of mutually parallel axes separated by walls made of a porous material. The element has, in transverse cross section, a polygonal, notably quadratic cross section delimited by exterior wall elements of mean thickness E. It is characterized in that at least one corner of said polygon, preferably all the corners of the polygon, has, along the bisector of the angle at said corner, an additional thickness $e_c$, such that the total thickness $E_c$ expressed in the same unit(s) of the external wall, likewise measured along said bisector of the angle at said corner, is greater than the mean thickness E of said exterior walls by a factor of at least 1.43. According to another essential feature of the present invention, said additional thickness $e_c$ is obtained at least in part by an additional quantity of material on the external face of said corner.

According to advantageous embodiments of the present invention, which may obviously as appropriate be combined with one another:

- The monolithic element has, in transverse cross section, a substantially quadratic or triangular shape, and the corners have vertex angles α of between 60 and 120°.
- The monolithic element has a transverse cross section of substantially square shape.
- Said additional thickness has a substantially rounded external edge that can be inscribed inside a radius of curvature R of between 0.3 and 3 mm.
- Said additional thickness, in transverse cross section, extends over a length $l_1$ and has a maximum value $e_1$ along the first wall element that makes up the corner and over a length $l_2$ and has a maximum value $e_2$ along the second wall element that makes up the corner, and in which:

$$0.5l_1 < l_2 < 2l_1$$

$$0.5e_1 < e_2 < 2e_1.$$

- The lengths $l_1$ and $l_2$ described hereinabove are substantially equal.
- The additional thicknesses $e_1$ and $e_2$ described hereinabove are substantially equal.
- The ratio of the total thickness $E_c$ of the external wall, likewise measured along the bisector of the angle at said corner (11), to the mean thickness E of said walls is greater than or equal to 1.45, preferably greater than 1.5, and very preferably greater than 1.6.
- The ratio of the total thickness $E_c$ of the external wall, likewise measured along the bisector of the angle at said corner, to the mean thickness E is less than or equal to 2.8, preferably less than or equal to 2.5, and even more preferably less than 2.
- The mean thickness E of the external walls of the channels is between 100 and 1000 microns, preferably between 300 and 800 microns.
- The thickness of the internal walls of the channel is between 100 and 1000 microns, preferably between 200 and 600 microns.
- Said ducts are plugged by plugs at one or other of their ends in order to delimit inlet ducts opening onto a gas intake face and outlet ducts opening onto a gas discharge face, so that the gas passes through the porous walls.
- Said additional thickness extends over the entire length of the element.
- The porous material is silicon carbide (SiC), silicon nitride or aluminum titanate, particularly silicon carbide. The porous material of which the individual element is made is, for example, silicon carbide recrystallized at a temperature of between 2100 and 2400° C.

According to another aspect, the present invention also relates to a structure, notably a particulate filter, obtained by assembling a plurality of monolithic elements as previously described, said elements being joined together by a cement jointing compound.

For preference, in such a structure, the ratio of the additional thickness $e_1$ to the mean thickness of the cement jointing compound between two constituent elements (measured in the same units, of course), in said transverse plane, is less than or equal to 0.4 and/or the ratio of the additional thickness $e_2$ to the mean thickness of the cement jointing compound, still in said transverse plane, is less than or equal to 0.4. Preferably, these two ratios are less than or equal to 0.4.

For preference, the cement jointing compound comprises grains and/or a matrix of ceramic nature.

Advantageously, within the filter, said elements and the cement jointing compound essentially contain the same ceramic material, and are preferably based on silicon carbide (SiC).

The invention will be better understood from reading the description of various embodiments of the invention which follow, these respectively being illustrated by FIGS. 1 and 2.

According to well-known techniques, all the monolithic elements are advantageously obtained by extruding a loose paste, for example of silicon carbide, which after firing forms a porous honeycomb structure.

The shape of the extruder head is configured according to conventional methods, for example such as described in patent U.S. Pat. No. 5,761,787, to obtain and form honeycomb elements that have additional thicknesses at the corners according to the invention, as schematically depicted in the following FIGS. 1 and 2.

Figure 1:
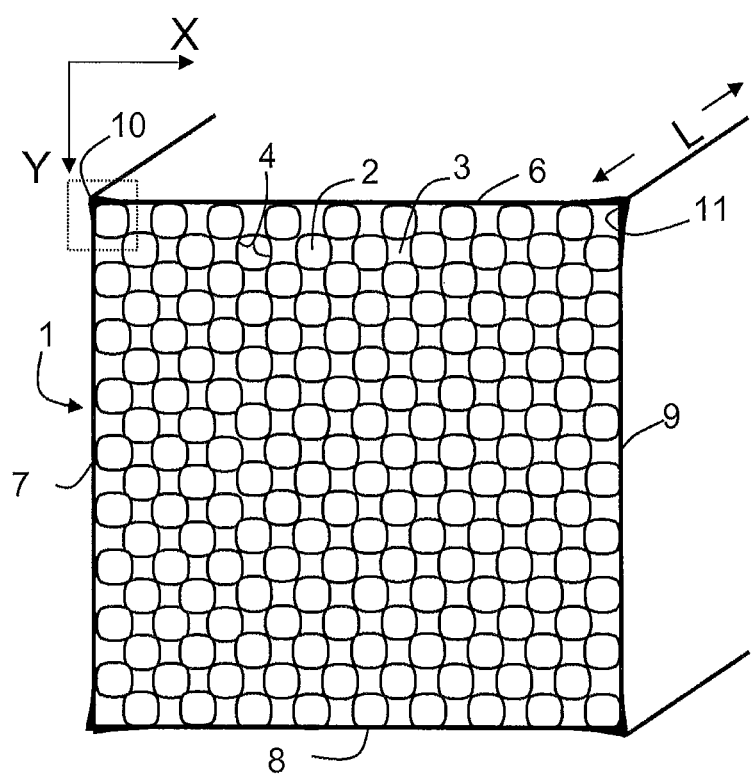
FIG. 1 is a schematic and perspective cross section through a monolithic element according to the invention.

Without this implying any restriction, the extruded structure is, according to FIG. 1, in the form of a monolithic individual element or block 1, the exterior shape of which is that of a rectangular parallelepiped extending along a longitudinal axis between its upstream and downstream faces. The transverse cross section is substantially square. Opening onto the ends of the elements 1 are a plurality of adjacent channels 2, 3, the main axis of which is parallel to the longitudinal axis L of the block.

In a way that is known but not depicted in the figures, the extruded porous structures may be alternately plugged on their upstream face or on their downstream face by respective upstream and downstream plugs, to form outlet channels 3 and inlet channels 2, respectively, for the formation of filtering structures. Each channel 2 or 3 therefore defines an interior volume delimited by internal walls 4, a plugging stopper (not depicted in the figures) arranged either on the upstream face in the case of an outlet channel or on the downstream face in the case of an inlet channel and an opening opening alternately toward the downstream face or the upstream face such that the inlet channels 2 and outlet channels 3 are in fluidic communication via the internal walls 4.

In a way that is known and has not been depicted in the figures, several monolithic individual elements 1 are assembled with one another by bonding using a cement jointing compound of ceramic nature, for example likewise based on silicon carbide, into a filtration structure or assembled filter. The assembly thus formed has then to be machined in order, for example, to adopt a round or ovoid cross section, and then for example has to be covered with a cement sealant in order to make it gas tight and give it a smooth external surface.

When the monolithic elements are plugged as previously described, this yields an assembled filter that can be inserted in an exhaust line, using well known techniques. In operation, the flow of exhaust gases enters the filter via the inlet channels 2 then passes through the filtering internal walls 4 of these channels to access the outlet channels 3. For further information regarding the structure of the monolithic elements and how they are assembled to form a filter, reference may, for example, be made to applications EP 1142619, WO 05/063462 or even WO 05/016491.

In the embodiment depicted in FIG. 1, the transverse cross section of the inlet channels 2 differs from that of the outlet channels 3. Thus, the transverse cross sections of the inlet channels 2 are greater than those of the outlet channels 3, in order to increase the overall volume of the inlet channels at the expense of that of the outlet channels. In the embodiment illustrated in the figures, the walls 4 follow on from one another, in transverse section and in a horizontal (along the axis x) or vertical (along the axis y) row of channels to define a sinusoidal or wavy shape. The wall elements undulate for example substantially by a sinusoidal half period over the width of a channel.

In one application of the structure as a filter, the particulate storage capability per individual element 1 is thus advantageously increased. However, it would not constitute a departure from the scope of the invention if the transverse cross sections of the inlet and outlet channels were identical and the walls 4 were planar.

External wall elements 6, 7, 8, 9 of thickness E complete and surround the internal walls 4. These wall elements meet and intersect in pairs at a bisector, at corners that have vertex angles $\alpha=90°$ in the case of the square-section structure depicted in FIG. 1.

Figure 2:
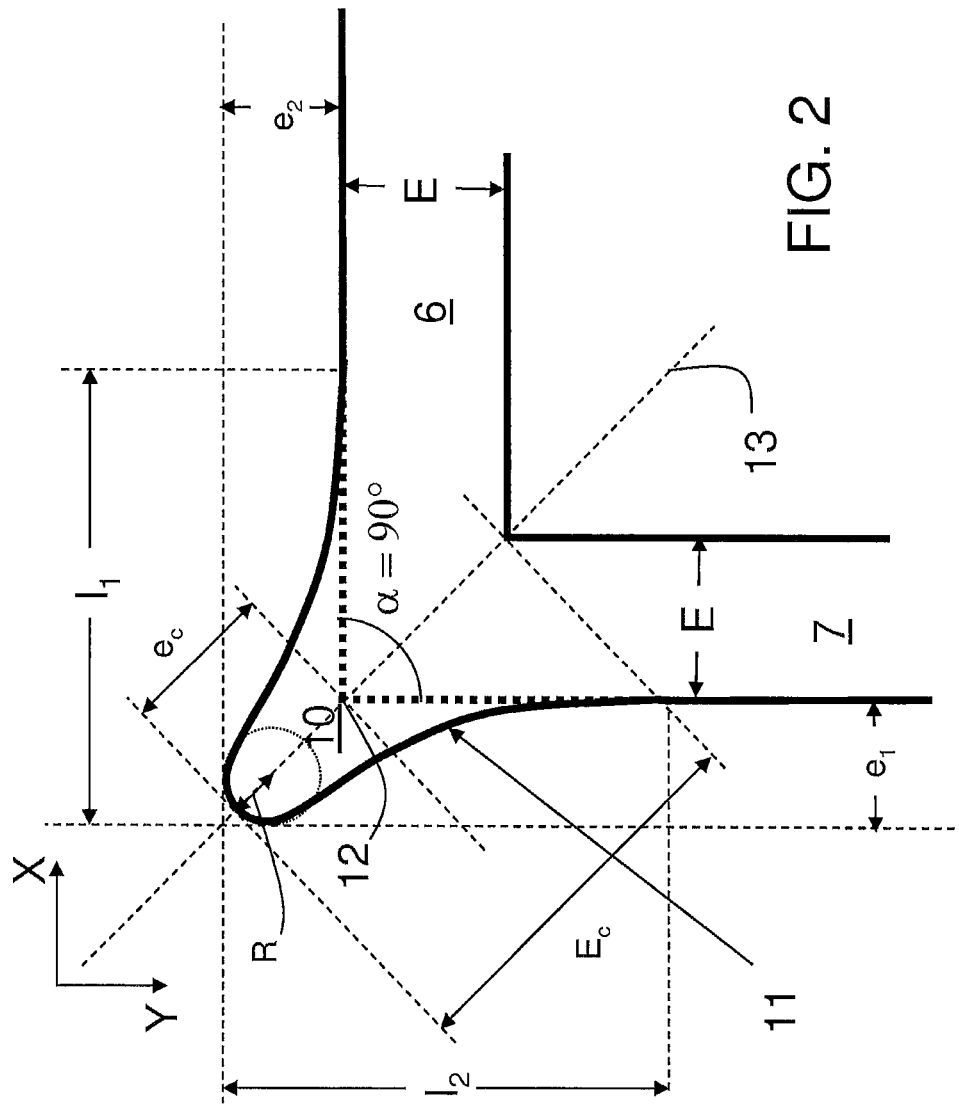
FIG. 2 is a more detailed schematic view, deliberately exaggerated, in this same transverse cross section, of the corner part of the monolithic element according to the invention.

FIG. 2 schematically and in greater detail and in the same transverse section depicts the corner part of the monolithic element described in FIG. 1. More specifically, FIG. 2 illustrates in greater detail (and in exaggerated fashion in order to make it easier to study and to comprehend) the profile of the corners 11 that have the additional thicknesses 10. According to the invention, the filtering elements are therefore characterized, at the corner 11, by the presence of an additional thickness 10, in the form of an addition of material arranged at the external part 12 of the corner 11. This additional thickness is characterized by an additional layer of material by comparison with the conventional configuration described in the documents of the prior art and illustrated for example in application EP0816065.

More specifically, according to the conventional configuration and as depicted by the dotted lines in FIG. 2, the two wall elements 6 and 7 meet to form the exterior corners of the individual element, at straight edges making an angle of 90°, to form external edge corners along the entire length of the element.

According to the invention and as depicted in FIG. 1, an additional quantity of material, of thickness $e_c$ measured along the bisector 13 of the angle formed by the wall elements 6 and 7, is arranged at said corner 11. According to the invention, this additional quantity of material is present over the exterior side (the edge corner) 12 of the corner of the element so that, along said bisector 13, the value $e_c$ contributes to the total thickness $E_c$ of the external wall, and in such a way that said total thickness $E_c$ of the wall, still along this same bisector, is greater than the mean thickness E of said walls 6 and 7 by a factor of at least 1.43, preferably of at least 1.45 or even of at least 1.5, or even highly preferably of at least 1.6.

As depicted in FIG. 2, said additional thickness preferably has a rounded external edge, particularly one that can be inscribed inside a radius of curvature R of between 0.3 and 3 mm, the center of the circle inscribed along the rounded exterior edge being situated on said bisector 13.

According to the invention, said additional thickness extends over a length $l_1$ along the first wall element 6 of which the corner 11 is made (i.e. in the direction X) and over a length $l_2$ along the second wall element 7 of which the corner 11 is made (i.e. in the direction Y). For preference, the ratio of the lengths $l_1$ and $l_2$ is between 0.5 and 2 and highly preferably is close to 1 or equal to 1.

According to the invention, said additional thickness 10 has a maximum value $e_1$ with respect to the first wall element 7 of which the corner is made and a maximum value $e_2$ with respect to the second wall element 6 of which the corner is made. For preference, the ratio of the lengths $e_1$ and $e_2$ is between 0.5 and 2, and highly preferably is close to 1 or equal to 1.

Typically, the elements channel density is between 1 and around 280 c/cm², preferably between around 14 and around 62 c/cm². According to the invention, the additional thickness at the corners preferably extends along the entire length L of the element, from the upstream face to the downstream face.

The invention and the advantages thereof will be better understood from studying the following example which is given purely by way of illustration.

EXAMPLE

The elements according to the invention were synthesized in the conventional way:

More specifically, a population of monolithic honeycomb elements made of silicon carbide were synthesized in accordance with the techniques of the prior art, for example described in patents EP 816 065, EP 1 142 619, EP 1 455 923 or even WO 2004/090294.

To do this, in a way comparable with the method described in application EP 1 142 619, 70 wt % of a SiC powder, the grains of which had a median diameter $d_{50}$ of 10 microns, were first of all mixed with a second SiC powder, the grains of which had a median diameter $d_{50}$ of 0.5 microns. Within the meaning of the present description, the median pore diameter $d_{50}$ means the diameter of the particles such that respectively 50% of the total population of the grains has a size smaller than this diameter. Added to this mixture is a porogen of polyethylene type in a proportion equal to 5 wt % of the total weight of SiC grains and a forming additive of methyl cellulose type in a proportion equal to 10 wt % of the total weight of SiC grains.

The necessary quantity of water is then added and the mixture is mixed until a homogeneous paste is obtained that has a plasticity that allows it to be extruded through a die configured to yield monolith blocks of square cross section and the internal channels of which have a transverse cross section illustrated schematically in FIG. 1. The half-period P of the undulations is 1.83 mm.

The unfired monoliths obtained are dried by microwave for long enough to bring the content of chemically unbonded water down to under 1 wt %.

The channels of each face of the monolith are alternately plugged using well known techniques, for example described in application WO 2004/065088.

The monoliths (elements) are rid of their binder then fired in an atmosphere of argon with a temperature-rise gradient of 20° C./hour until a maximum temperature of 2200° C. is reached, which temperature is then held for 6 hours.

The porous material obtained has an open porosity of 47% and a median pore diameter of the order of 15 micrometers.

The structural features of the elements thus obtained are given in table 1 below, in conjunction with the data already described in the foregoing description of FIGS. 1 and 2.

To form the filter, 16 (4×4) elements are then assembled with one another by bonding using a cement compound with the following chemical composition: 72 wt % SiC, 15 wt % $Al_2O_3$, 11 wt % $SiO_2$, the rest consisting of impurities predominantly of $Fe_2O_3$ and alkali metal and alkaline-earth metal oxides. The mean thickness of the joint between two adjacent blocks is of the order of 2 mm. The thermal conductivity of the cement jointing compound after heat treatment is around 2.1 W/m·K at ambient temperature and its measured open porosity is around 38%.

The assembly is then machined by abrasion, the most peripheral parts being removed to form assembled filters of cylindrical shape. A cement with the same composition as the cement jointing compound is applied at the periphery of the machined filter at a mean thickness of 1 mm in order to smooth the external surface of the cylindrically shaped filters.

A plurality of assembled filters were thus produced from individual elements.

TABLE 1

| Cross section of elements | Size of elements (cross section) (mm × mm) | Length of elements (cm) | Geometry of internal channels | Channels density (c/cm²) |
| --- | --- | --- | --- | --- |
| square | 35.8 × 35.8 | 25.4 | "wavy" | Around 30 |
| Number of assembled elements | Thickness of joint (mm) | Final diameter of assembled filter (mm) | Thickness of internal walls (μm) | Mean thickness E of external walls (μm) |
| 16 | 1.2 | 144 | 370 | 650 |
| Additional thickness $e_c$ along the bisector (μm) | Total thickness $E_c$ along the bisector (μm) | Max thickness $e_1$ (μm) | Max thickness $e_2$ (μm) | $l_1$ (mm) |
| 420 | 1136 | 300 | 300 | 10 |
| $l_2$ (mm) | Radius of curvature R (mm) | | | |
| 10 | 2 | | | |

During the step of resizing the filters, unlike the filters known in the art, no tearing out of peripheral individual elements from the preassembled structures under the forces used to abrade the peripheral parts of the filter was observed. Such a result incontestably demonstrates that the polygonal filtering elements according to the present invention, having an additional quantity of porous material on the external faces of the corners, allows significant improvement in the cohesion of the filtering elements within the structure, notably when this structure has to be subjected to high radial mechanical stresses.

In the foregoing description, the advantages of the present invention described chiefly in relation to the honeycomb structures used as particulate filters in an internal combustion engine exhaust line to eliminate the soot produced by the combustion of a diesel or gasoline fuel.

Quite obviously, the invention is not restricted to such an application and can also be applied in any field in which the aforementioned problems arise, particularly in the field of heat exchangers.

The invention claimed is:

1. A monolithic honeycomb element comprising a plurality of adjacent ducts of mutually parallel axes separated by internal walls made of a porous material, said element having, in transverse cross section, a shape of a polygon that is delimited by an exterior wall forming a periphery of the polygon, wherein a corner of said polygon has, along a bisector of an angle formed by said corner, an additional thickness, such that a total thickness of the exterior wall, measured along said bisector of the angle at said corner, is greater than a mean thickness of said exterior wall by a factor of at least 1.43, said additional thickness being obtained at least in part by an additional quantity of material provided on an external face of the exterior wall at said corner so that the external face of said at least one corner protrudes away from a central part of said element along said bisector.

2. The monolithic element as claimed in claim 1, wherein said exterior wall includes a plurality of exterior wall elements each forming a side of the polygon.

3. The monolithic element as claimed in claim 2, wherein the mean thickness of the exterior wall elements is between 100 and 1000 microns.

4. The monolithic element as claimed in claim 1, wherein said element has, in transverse cross section, a substantially quadratic or triangular shape, and of which the corners have vertex angles α of between 60 and 120°.

5. The monolithic element as claimed in claim 1, wherein said element has a transverse cross section of substantially square shape.

6. The monolithic element as claimed in claim 1, wherein said additional thickness has a substantially rounded external edge that can be inscribed inside a radius of curvature R of between 0.3 and 3 mm.

7. The monolithic element as claimed in claim 1, wherein, in transverse section, said additional thickness extends over a length $l_1$ and has a maximum value $e_1$ along a first exterior wall element that makes up the corner and over a length $l_2$ and has a maximum value $e_2$ along a second exterior wall element that makes up the corner, and in which:

$0.5\ l_1 < l_2 < 2\ l_1$ $0.5\ e_1 < e_2 < 2\ e_1$.

8. The monolithic element as claimed in claim 7, wherein the lengths $l_1$ and $l_2$ are substantially equal and/or wherein the additional thicknesses $e_1$ and $e_2$ are substantially equal.

9. The monolithic element as claimed in claim 1, wherein the factor is greater than or equal to 1.45.

10. The monolithic element as claimed in claim 9, wherein the factor is greater than 1.5.

11. The monolithic element as claimed in claim 10, wherein the factor is greater than 1.6.

12. The monolithic element as claimed in claim 1, wherein said ducts are plugged by plugs at one or other of their ends in order to delimit inlet ducts opening onto a gas intake face and outlet ducts opening onto a gas discharge face, so that the gas passes through the porous internal walls.

13. The monolithic element as claimed in claim 1, wherein said additional thickness is present over the entire length of the element.

14. The monolithic element as claimed in claim 1, wherein the porous material is silicon carbide or silicon nitride.

15. An assembled structure obtained by assembly of a plurality of monolithic elements as claimed in claim 1, said elements being bonded together using a cement jointing compound.

16. The assembled structure as claimed in claim 15, wherein a ratio of the additional thickness to a mean thickness of the cement jointing compound between two constituent elements, in said transverse plane, is less than or equal to 0.4 and/or wherein a ratio of the additional thickness to a mean thickness of the cement jointing compound, in said transverse plane, is less than or equal to 0.4.

17. The assembled structure as claimed in claim 15, wherein the assembled structure is a particulate filter.

18. The monolithic element as claimed in claim 1, wherein said cross-section is a quadratic cross-section.

19. The monolithic element as claimed in claim 1, wherein each corner of the polygon has, along the bisector of the angle at said corner, an additional thickness, such that a total thickness of the exterior wall, measured along said bisector of the angle at said corner, is greater than a mean thickness of said exterior wall by a factor of at least 1.43, said additional thickness being obtained at least in part by an additional quantity of material on the external face of said corner.

* * * * *